US008376663B2

(12) United States Patent
Erceg et al.

(10) Patent No.: US 8,376,663 B2
(45) Date of Patent: *Feb. 19, 2013

(54) SEGMENTED CONVEYOR AND AIR FILM CHUTE

(75) Inventors: David Patrick Erceg, Concord, NC (US); Leroy A. Winkler, III, Charlotte, NC (US); Gonzalo Sotelo, Charlotte, NC (US); Richard D. Carwile, Waxhaw, NC (US)

(73) Assignee: Mantissa Corporation, Charlotte, NC (US)

( * ) Notice: Subject to any disclaimer, the term of this patent is extended or adjusted under 35 U.S.C. 154(b) by 377 days.

This patent is subject to a terminal disclaimer.

(21) Appl. No.: 12/721,041

(22) Filed: Mar. 10, 2010

(65) Prior Publication Data

US 2011/0222972 A1    Sep. 15, 2011

(51) Int. Cl.
*B65G 53/00* (2006.01)
(52) U.S. Cl. ............... 406/88; 406/1; 406/182; 414/676
(58) Field of Classification Search .................. 198/493; 193/2 R, 4, 25 A, 25 FT; 406/86, 88, 89, 406/1, 182; 414/676
See application file for complete search history.

(56) References Cited

U.S. PATENT DOCUMENTS

| | | | |
|---|---|---|---|
| 3,395,943 A | 8/1968 | Wilde | |
| 3,415,478 A * | 12/1968 | Williams, III | 248/346.4 |
| 3,429,544 A * | 2/1969 | Williams | 239/557 |
| 3,651,956 A | 3/1972 | Kornylak | 214/1 |
| 3,685,632 A | 8/1972 | Brady | 406/88 |
| 3,773,325 A | 11/1973 | Crossman et al. | 273/126 |
| 3,871,585 A | 3/1975 | Crossman et al. | 239/553.3 |
| 3,887,187 A | 6/1975 | Crossman et al. | 273/126 |
| 4,193,489 A | 3/1980 | Siniscal | |
| 4,457,434 A | 7/1984 | Brown et al. | 406/88 |
| 4,623,545 A | 11/1986 | Pivonka | 426/502 |
| 4,666,726 A | 5/1987 | Pivonka | 198/493 |
| 4,744,454 A | 5/1988 | Polling | 198/365 |
| 5,054,601 A | 10/1991 | Sjogren et al. | 198/365 |
| 5,086,905 A | 2/1992 | Polling | 198/365 |
| 5,110,128 A | 5/1992 | Robbins | 273/126 |
| 5,186,299 A | 2/1993 | Stimson | 193/2 |
| 5,220,986 A | 6/1993 | Winkler, III | 193/25 |
| 5,531,518 A | 7/1996 | Alves | 366/68 |

(Continued)

FOREIGN PATENT DOCUMENTS

WO    WO 90/09944    9/1990

OTHER PUBLICATIONS

A Two-Dimensional Air Table; American Journal of Physics, Nov. 1963; vol. 31, Issue 11, pp. 867-869.

(Continued)

*Primary Examiner* — Joseph A Dillon, Jr.
(74) *Attorney, Agent, or Firm* — MacCord Mason PLLC

(57) ABSTRACT

A package sorting system. The package sorting conveyor system includes a conveying track, at least one unloading station and an air-film lubricated entrance chute upstream of the unloading station to receive the package. In one embodiment, the entrance chute includes a plenum including a plurality of spaced apart apertures and an opening for communicating with an air supply; and a segmented conveying surface in communication with the apertures, wherein the segmented conveying surface includes at least one air-film lubricated bottom surface and at least one air-film lubricated side wall substantially perpendicular to the at least one bottom surface. In one embodiment, the apparatus further includes a positioner assembly for selectively positioning the outlet of the entrance chute.

44 Claims, 11 Drawing Sheets

U.S. PATENT DOCUMENTS

| | | | | |
|---|---|---|---|---|
| 5,562,368 | A | 10/1996 | Newton | 406/86 |
| 6,040,553 | A | 3/2000 | Ross | |
| 6,050,390 | A | 4/2000 | Fortenbery et al. | 198/370.03 |
| 6,095,314 | A | 8/2000 | Fortenbery | 198/360 |
| 6,168,006 | B1 | 1/2001 | Bytow | 198/370.04 |
| 6,208,908 | B1 | 3/2001 | Boyd et al. | 700/216 |
| 6,220,421 | B1 | 4/2001 | Hugon et al. | 198/370.07 |
| 6,227,377 | B1 | 5/2001 | Bonnet | 209/650 |
| 6,499,582 | B1 | 12/2002 | Gillott | 198/360 |
| 6,533,099 | B2 | 3/2003 | Bonham et al. | 198/370.07 |
| 7,165,918 | B2 | 1/2007 | Kruse | 406/93 |
| 7,329,299 | B2 * | 2/2008 | Moriya et al. | 55/385.6 |
| 7,344,350 | B2 * | 3/2008 | Ikehata et al. | 414/676 |
| 7,597,185 | B1 | 10/2009 | Fortenbery | |
| 7,743,927 | B2 * | 6/2010 | Svatek et al. | 209/656 |
| 8,033,762 | B2 * | 10/2011 | Lopez et al. | 406/182 |
| 8,137,046 | B2 * | 3/2012 | Kishimoto et al. | 414/676 |

OTHER PUBLICATIONS

Glasgow Products Inc., Air Conveying Concept; copyright 2003-2010.

Glasgow Products Inc., Typical Applications; copyright 2003-2010.

SailRail Automated Systems, Inc., Indexair Linear; undated related art.

\* cited by examiner

SEGMENTED CONVEYOR AND AIR FILM CHUTE

FIELD

The present inventions relate to package sorting conveyor systems, and, more particularly, to an improved air-film lubricated segmented conveying surface.

BACKGROUND OF THE DISCLOSURE

Conveyor systems having a number of individual carrying carts have been used for many years to carry and sort products such as shoes and apparel or other items such as mail. Conventional tilt tray sorters discharge their goods onto individual chutes located near each packer. Limitations that had previously plagued package-sorting conveyor systems were the lack of versatility and amount of floor space required by the systems, especially when sorting a variety of items on the same conveyor was desired. In particular, the conveyor systems were not well suited for transmission of differently packaged products having unique friction coefficients and weights since the pitch angles associated with each chute are specially designed to handle a specific product. However, many manufacturers are now sorting or want the option to sort packages together that were previously never mixed such as mixed sorts, including both shoes and apparel.

In addition, apparel in plastic packaging conforms to the shapes of most discharge chutes. With the increase in the use of low-density polyethylene (LDPE) packaging, this may result in "clinging" to the chute surfaces depending on the humidity in the distribution center, which changes between winter and summer. Also, boxes used for packages may be large enough to "bridge" curved secondary chutes and not have sufficient contact for proper discharge at all angles.

Thus, there remains a need for a new and improved package sorting conveyor system having a conveying track and an improved air-film lubricated entrance chute and/or secondary chute having segmented walls for receiving packages from the conveying track having a variety of weights and packaging materials.

SUMMARY OF THE INVENTIONS

The present disclosure is directed to a package sorting system. The package sorting conveyor system includes a conveying track, at least one unloading station and an air-film lubricated entrance chute upstream of the unloading station to receive the package. In one embodiment, the entrance chute includes: (i) a plenum including a plurality of spaced apart apertures and an opening for communicating with an air supply; and (ii) a segmented conveying surface in communication with the apertures, wherein the segmented conveying surface includes at least one air-film lubricated bottom surface and at least one air-film lubricated side wall substantially perpendicular to the at least one bottom surface. The present inventions may also include a positioner assembly for selectively positioning the outlet of the entrance chute.

The present inventions may further include a conveying channel including at least one secondary downstream chute located downstream from the conveying surface. The at least one secondary downstream chute is spaced horizontally or the at least one secondary downstream chute is spaced vertically or both.

The present inventions may further include at least two distinct modes of operation. In other embodiments, the modes of operation includes actively moving air through said plenum to provide an air-film, stopping the air flow or reversing the air flow to provide a braking effect. Other embodiments include changing the modes of operation.

The present inventions may further include an air supply. In other embodiments, the air supply is ambient air under pressure. In one embodiment, the air supply includes a fan for circulating air through the opening into the plenum and out of the apertures to provide the air-film.

In one embodiment, the conveying surface is inclined. In another embodiment, the entrance chute includes a pair of air-film lubricated sidewalls substantially perpendicular to the at least one bottom surface.

In other embodiments, the conveying surface includes a low-friction, wear-resistant polymeric material. Other embodiments of the material include a high-density polyethylene.

In one embodiment, the surfaces of the at least one secondary downstream chute located downstream from the conveying surface include at least one removable sheet of a low-friction, wear-resistant polymeric material. In other embodiments, the material is selected for summer use where humidity levels are greater than about 50% relative humidity and winter use where humidity levels are less than about 50% relative humidity for low-density polyethylene (LDPE).

In one embodiment, the positioner assembly selectively positions the outlet of the entrance chute between at least a first and a second position. In other embodiments, the positioner assembly includes a drive. Typically, the drive includes a rotary actuator. The drive may further include a linear actuator.

The present inventions further include an entrance chute inlet adjacent to the conveying track at an unloading station for receiving a package. In other embodiments, the entrance chute inlet is wider than the outlet of the entrance chute for receiving the package after it slides off the conveying track onto the inlet.

In one embodiment, the at least one sidewall is located downstream of the direction of travel of the conveying track for preventing the package from tipping over by forming a transition zone funnel. Also, the entrance chute outlet is located downstream from the at least one sidewall to discharge the package from the entrance chute. In other embodiments, the at least one sidewall is between about 0° and about 20° from perpendicular to the entrance chute inlet, typically when the entrance chute is positioned perpendicular to the conveying track. Other embodiments include at least one sidewall that is about 10° from perpendicular to the entrance chute inlet, typically when the entrance chute is positioned perpendicular to the conveying track. Typically, a forward direction of the package changes about 90° from its initial direction on the conveying track to its direction at the outlet of the entrance chute.

Accordingly, one aspect of the present inventions is to provide a package sorting conveyor system including: (a) a conveying track; (b) at least one unloading station; and (c) an air-film lubricated entrance chute upstream of the unloading station to receive the package, the entrance chute including: (i) a plenum including a plurality of spaced apart apertures and an opening for communicating with an air supply; (ii) a segmented conveying surface in communication with the apertures, wherein the segmented conveying surface includes at least one air-film lubricated bottom surface; and (iii) at least one side wall substantially perpendicular to the at least one bottom surface.

Another aspect of the present inventions is to provide an air-film lubricated entrance chute for a package sorting conveying system having a conveying track and at least one unloading station including: (a) a plenum including a plurality of spaced apart apertures and an opening for communicating with an air supply; and (b) a segmented conveying surface in communication with the apertures, wherein the segmented conveying surface includes at least one bottom surface and at least one air-film lubricated sidewall substantially perpendicular to the at least one air-film lubricated bottom surface.

Still another aspect of the present inventions is to provide a package sorting conveyor system including: (a) a conveying track; (b) at least one unloading station; (c) an air-film lubricated entrance chute upstream of the unloading station to receive the package, the entrance chute including: (i) a plenum including a plurality of spaced apart apertures and an opening for communicating with an air supply; and (ii) a segmented conveying surface in communication with the apertures, wherein the segmented conveying surface includes at least one air-film lubricated bottom surface and at least one air-film lubricated side wall substantially perpendicular to the at least one bottom surface; and (d) a positioner assembly for selectively positioning the outlet of the entrance chute.

These and other aspects of the present inventions will become apparent to those skilled in the art after a reading of the following description of embodiments when considered with the drawings.

DESCRIPTION OF VARIOUS EMBODIMENTS

Figure 1:
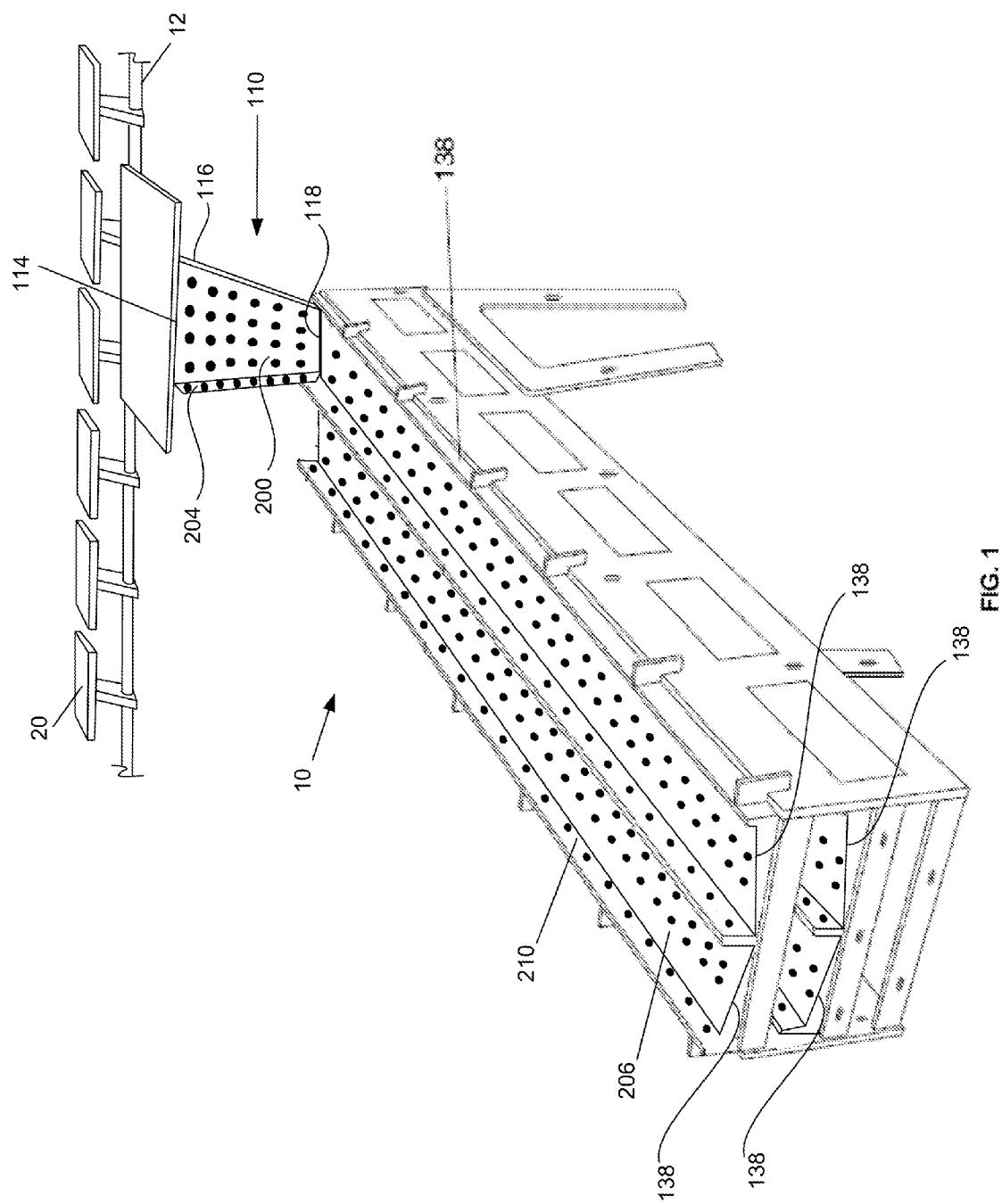
FIG. 1 is a perspective view of a conveying system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing particular embodiments of the inventions and are not intended to limit the inventions thereto. As best seen in FIG. 1, a sorting conveyor, generally designated 10, is shown constructed according to the present disclosure for transporting and sorting packages or other objects, i.e., for illustrative purposes only, raw material or the like. The sorting conveyor 10 includes a train of individual carts 20, connected end to end, which may form an endless loop around a closed conveyor track 12. Other embodiments may include a discontinuous loop.

FIG. 1 is a perspective view from the bottom of four secondary downstream chutes 138 looking up at the conveyor track 12. At the top of the four secondary downstream chutes 138 is a substantially segmented entrance chute 110. The inlet 114 of the entrance chute 110 is the side of the entrance chute 110 closest to the conveyor track 12, where packages, or objects, enter the entrance chute 110. The entrance chute 110 also includes an upwardly inclined downstream wall 116 for guiding packages, or objects, into the entrance chute 110. Typically, at least one of the inclined downstream walls 116 includes an air-film lubricated sidewall 204. Similarly, the entrance chute 110 includes an air-film lubricated bottom surface 200. In particular embodiments, four downstream chutes 138, any or all of which may include an air-film lubricated bottom surface 206 and/or at least one air-film lubricated side wall 210, are downstream from the entrance chute 110.

Figure 2:
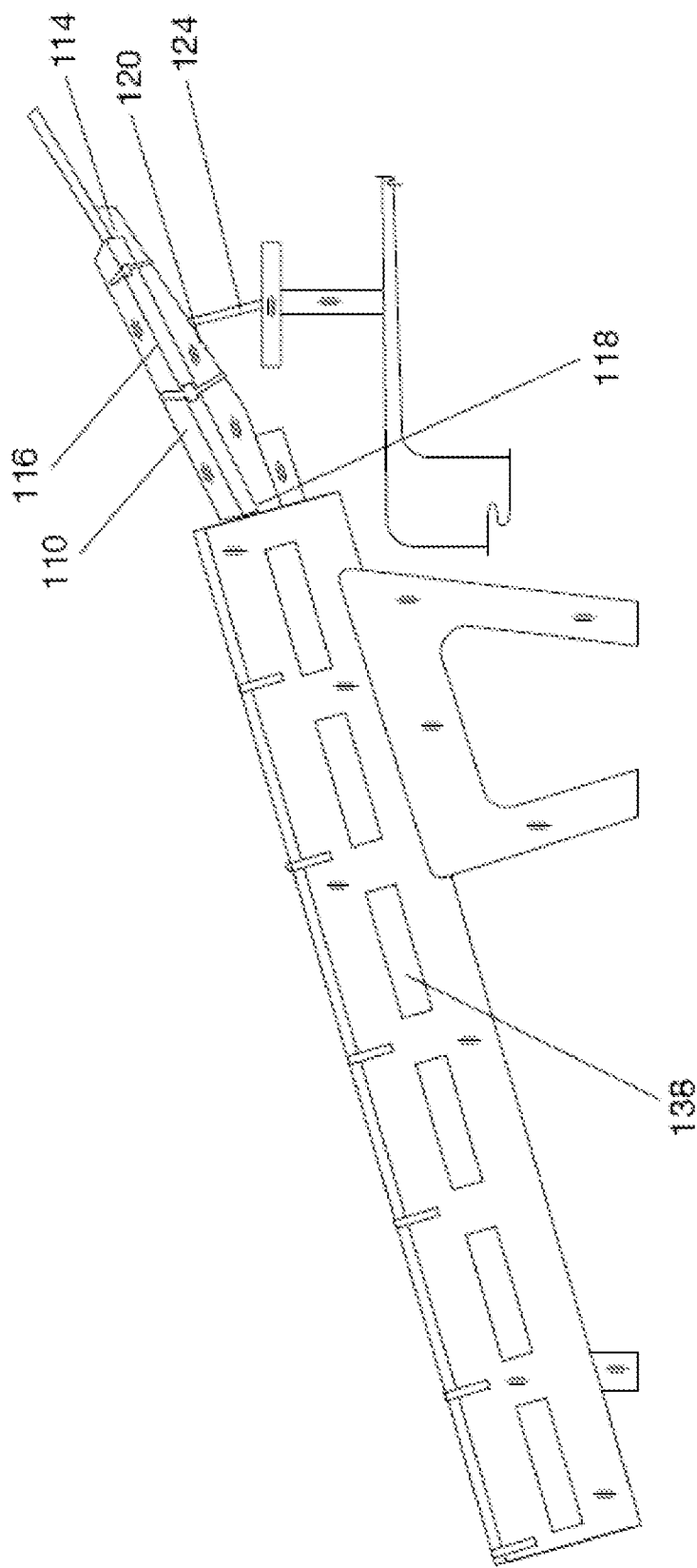
FIG. 2 is a side view of an entrance chute and secondary downstream chutes of the conveying system shown in FIG. 1.

FIG. 2 is a side view of the entrance chute 110 and the four secondary downstream chutes 138. The positioner assembly 120 selectively moves an entrance chute outlet 118 into alignment with one of the four secondary downstream chutes 138.

Figure 3:
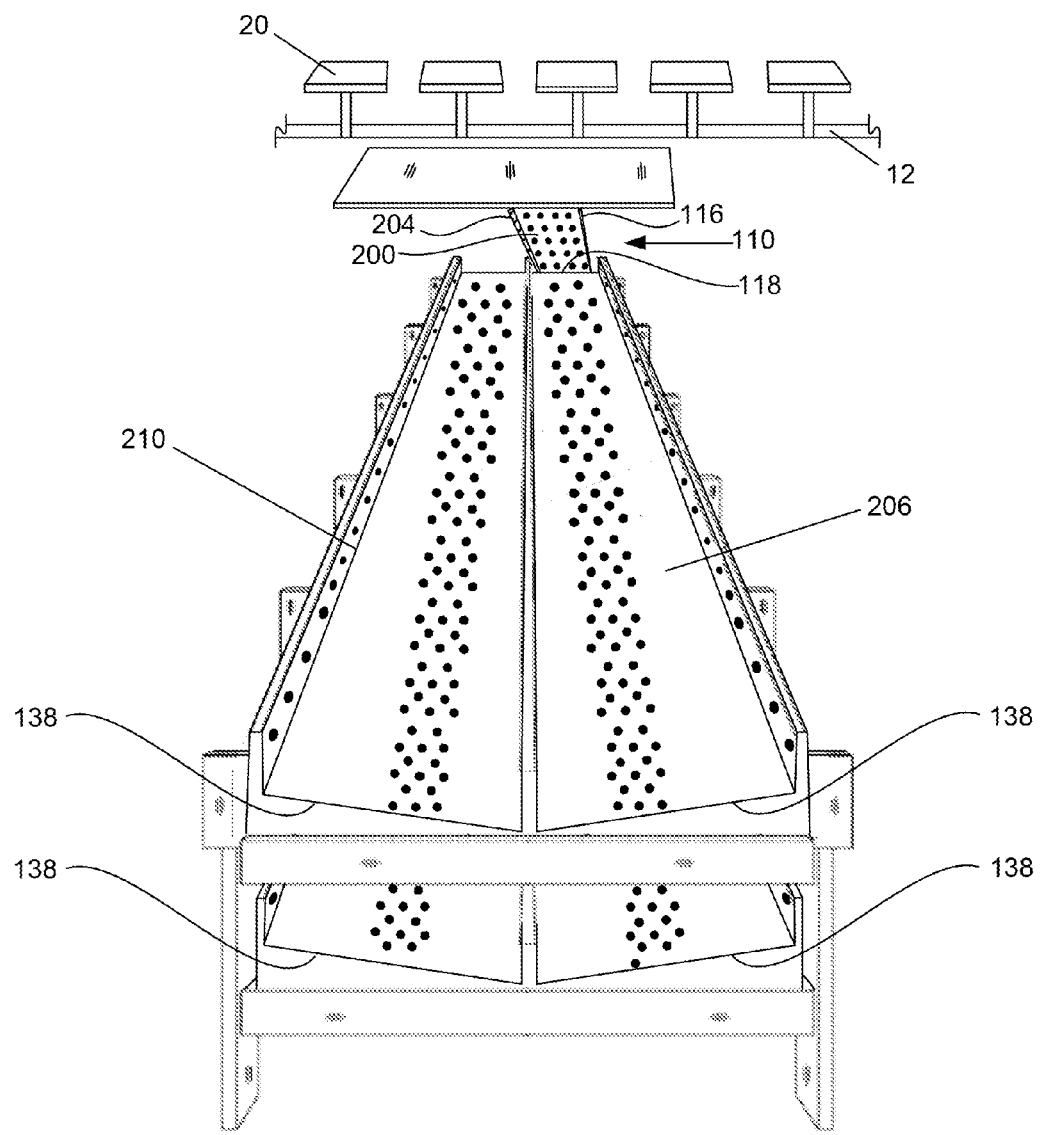
FIG. 3 is an end view of the four secondary downstream chutes and the entrance chute of the conveying system shown in FIG. 1.

As shown in FIGS. 1 and 3, a pair of downstream chutes 138 generally rest substantially atop one-another and run substantially parallel to a pair of downstream chutes 138 underneath. The position zone entrance chute 110, including the inlet 114, outlet 118, and upwardly inclined downstream wall 116. Other embodiments include a pair of three or more downstream chutes 138 underneath the entrance chute 110. In this particular embodiment having three downstream chutes 138, the middle chute may have a curved bottom.

FIG. 3 shows an end view of one embodiment of the four secondary downstream chutes 138. In this embodiment, the four secondary downstream chutes 138 are substantially segmented. Typically, the downstream chutes include a bottom surface 206 and at least one sidewall 210 that form a substantially non-parallel, discontinuous downstream chute 138. One or more of the bottom surface(s) 206 of the downstream chutes 138 may be inclined, e.g. angled in a variety of configurations against one or more of the side wall(s) 210, to enhance the columnizing orientation of the items moved along the downstream chutes 138 and/or to enhance air-lubrication along the conveying surfaces. In particular embodiments, the w-shaped bottom surface, as best seen in FIG. 3, may help drive items toward the center of the 'w' as the items are moved along the length of the downstream chute 138.

Other embodiments of the downstream chute 138 include one or more chute inserts. The chute insert, as well as the downstream chute 138 itself, may be a replaceable insert. The insert may be a high-density polyethylene or similar material selected to compliment a particular humid or static environment, for example in humidity greater than greater than about 50% relative humidity and humidity less than about 50% relative humidity, respectively.

FIGS. 1, 3, 8 and 9 illustrate embodiments of the air-film lubricated segmented entrance chute 110. Typically, the entrance chute 110 includes at least one, including two or more, sidewall(s) 204 that is substantially perpendicular to the bottom surface 200.

In this embodiment, the bottom surface 200 and a sidewall 204 form a substantially non-parallel, discontinuous entrance chute 110 to accept objects from the conveying surface and to guide the object onto a predetermined downstream chute 138.

Figure 4:
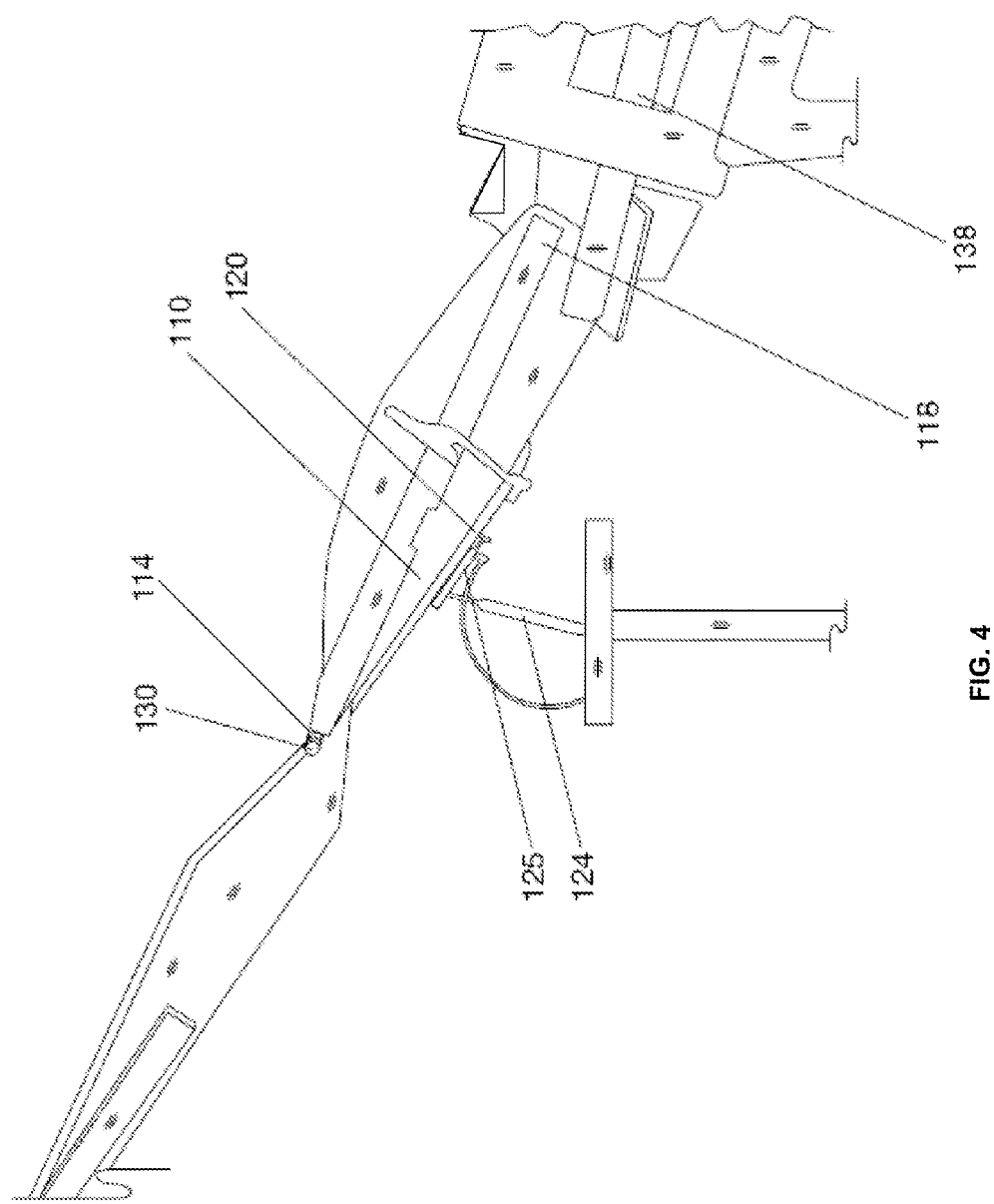
FIG. 4 is a side view of the entrance chute showing a positioner assembly.

FIG. 4 illustrates the entrance chute 110 may include the positioner assembly 120, which includes a drive 125 for moving the entrance chute 110 about an axis and a hinge joint 130 and vertical drive 124 for moving the entrance chute 110 about another axis.

Figure 5:
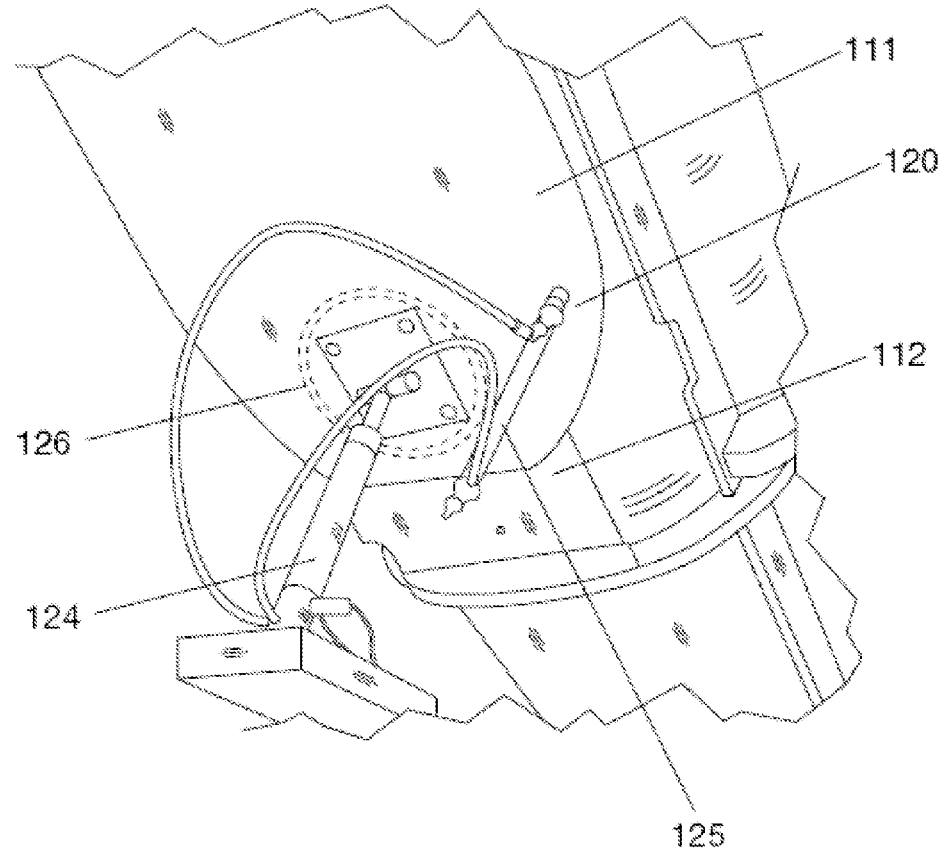
FIG. 5 is a bottom perspective view of the positioner assembly for the entrance chute.

FIG. 5 is a bottom perspective view of the positioner assembly 120 including a lower plate 111 and an upper plate 112. Also shown in FIG. 5, the rotary joint 126 and drive 125 and the vertical drive 124 for moving the entrance chute 110.

Figure 6:
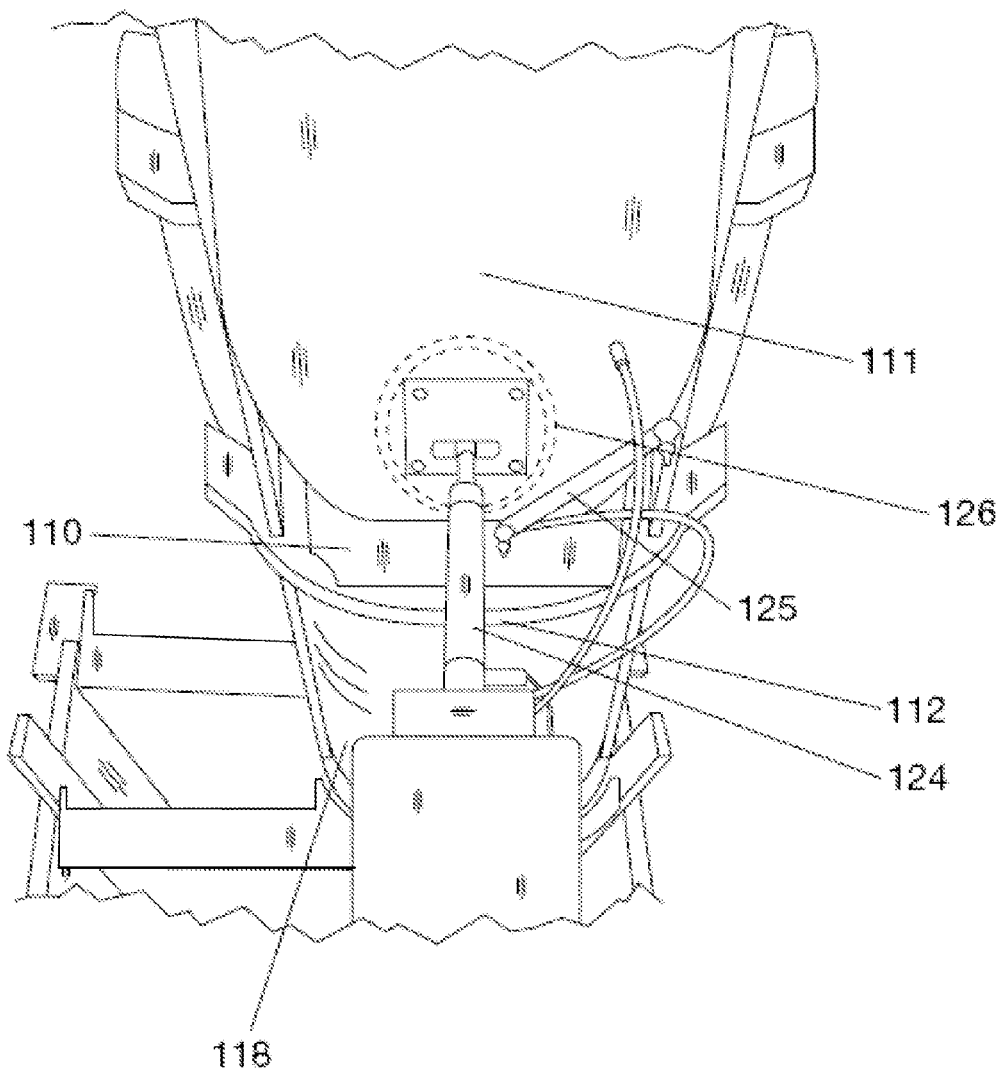
FIG. 6 is a bottom rear view of the positioner assembly for the entrance chute.

FIG. 6 is a rear bottom view of the positioner assembly including the upper 112 and lower plate 111 of the entrance chute 110. The drive 124 for moving the entrance chute 110 about an axis, and a drive 124 for moving the entrance chute 110 about another axis are also shown. In other embodiments, the entrance chute 110 may include the positioner assembly 120, which includes a rotary joint 126 and a drive 125 for moving the entrance chute 110 about an axis.

Figure 7:
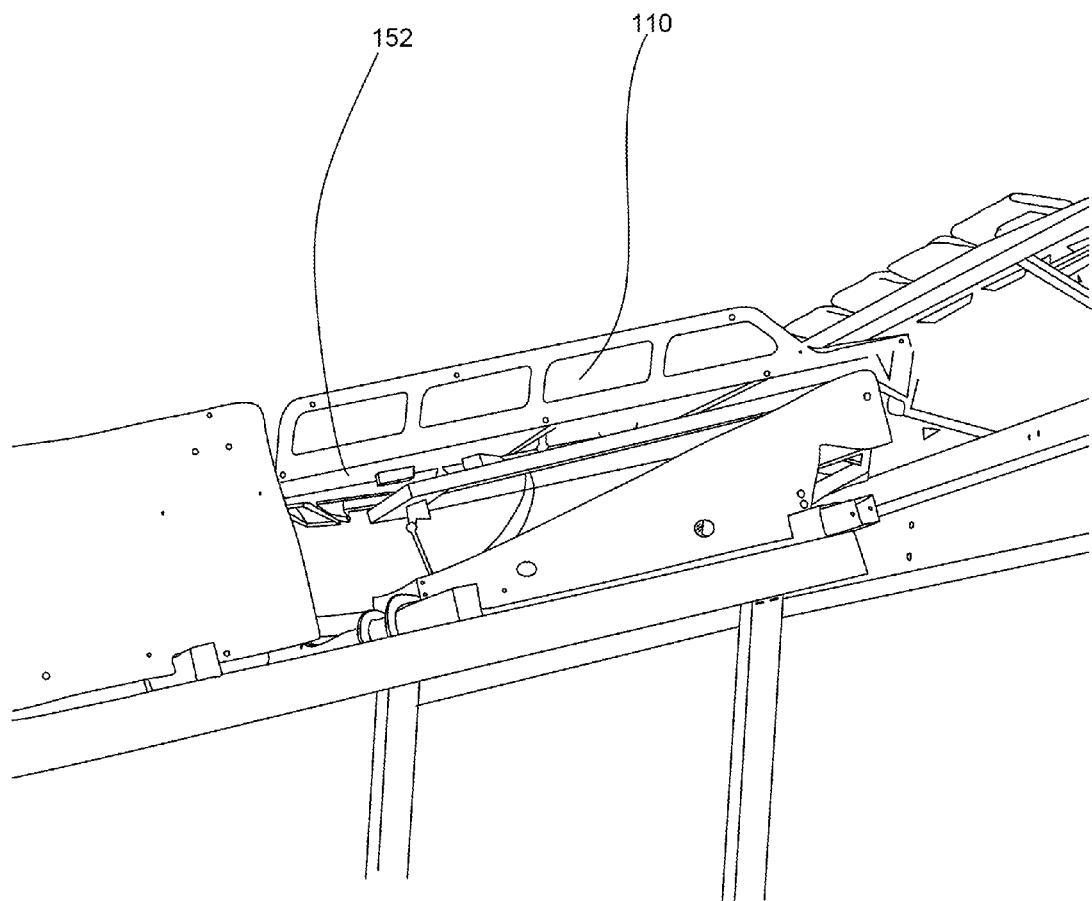
FIG. 7 is a side view of the entrance chute showing a plenum.
Figure 9:
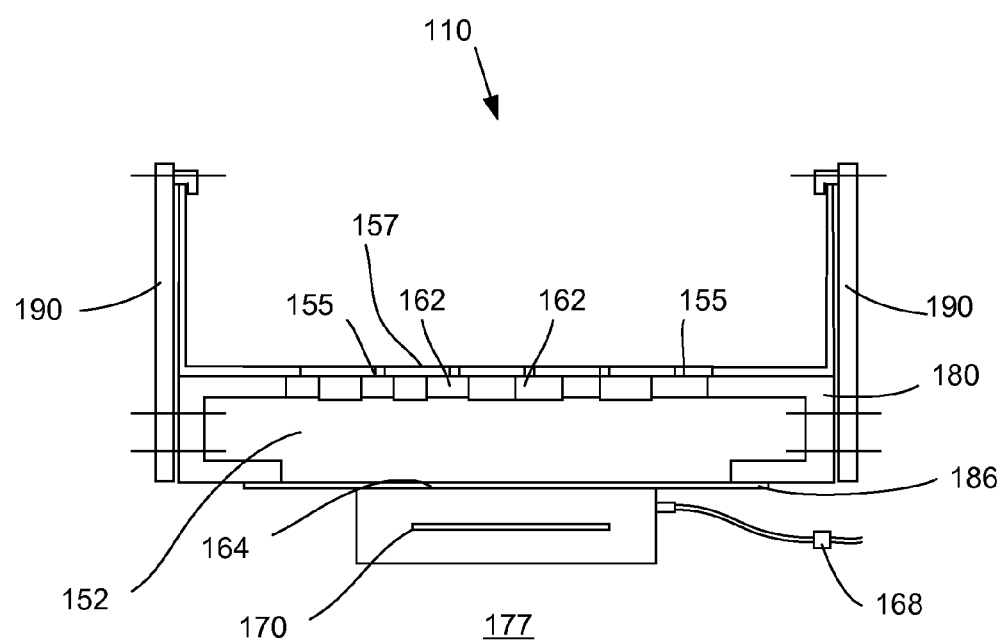
FIG. 9 is a cross-sectional view of an entrance chute of an embodiment according to FIG. 1.
Figure 10:
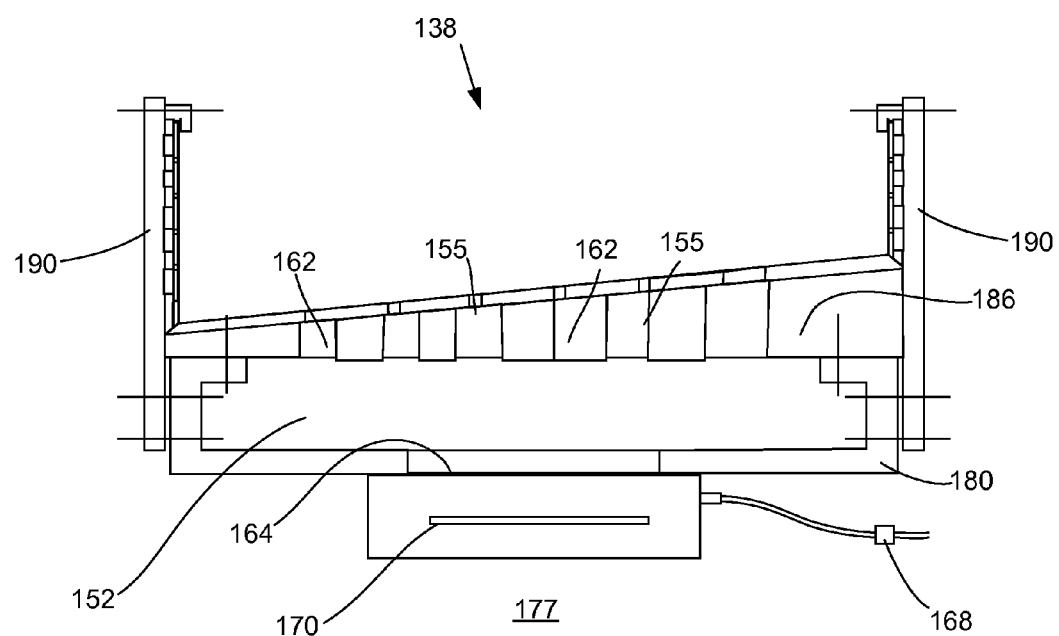
FIG. 10 is a cross-sectional view of a downstream chute of an embodiment according to FIG. 1.

FIGS. 7, 9 and 10 show a plenum 152 for air-film lubrication. Typically, a plenum(s) 152 is in fluid communication with one or more surfaces on the entrance chute 110 and a downstream chute 138, including the entrance chute's bottom surface 200 and at least one sidewall 204 and/or the downstream chute's bottom surface 206 and at least one sidewall 210. The conveyor is shown in FIG. 7 as the entrance chute 110, yet the plenum 152 and a conveying surface can also form components of one or more of the secondary downstream chutes 138 shown in FIGS. 1-4, which are also exemplary embodiments of the air-film lubricated system. In other embodiments, one or more of the downstream chute(s) 138 are in fluid communication with one another, and/or in communication with the air-lubricated entrance chute 110, to allow air provided by at least one plenum 152 to supply air to any particular chute, typically thereby supplying air to a downstream chute's bottom surface 206 and/or sidewall 210.

Figure 8:
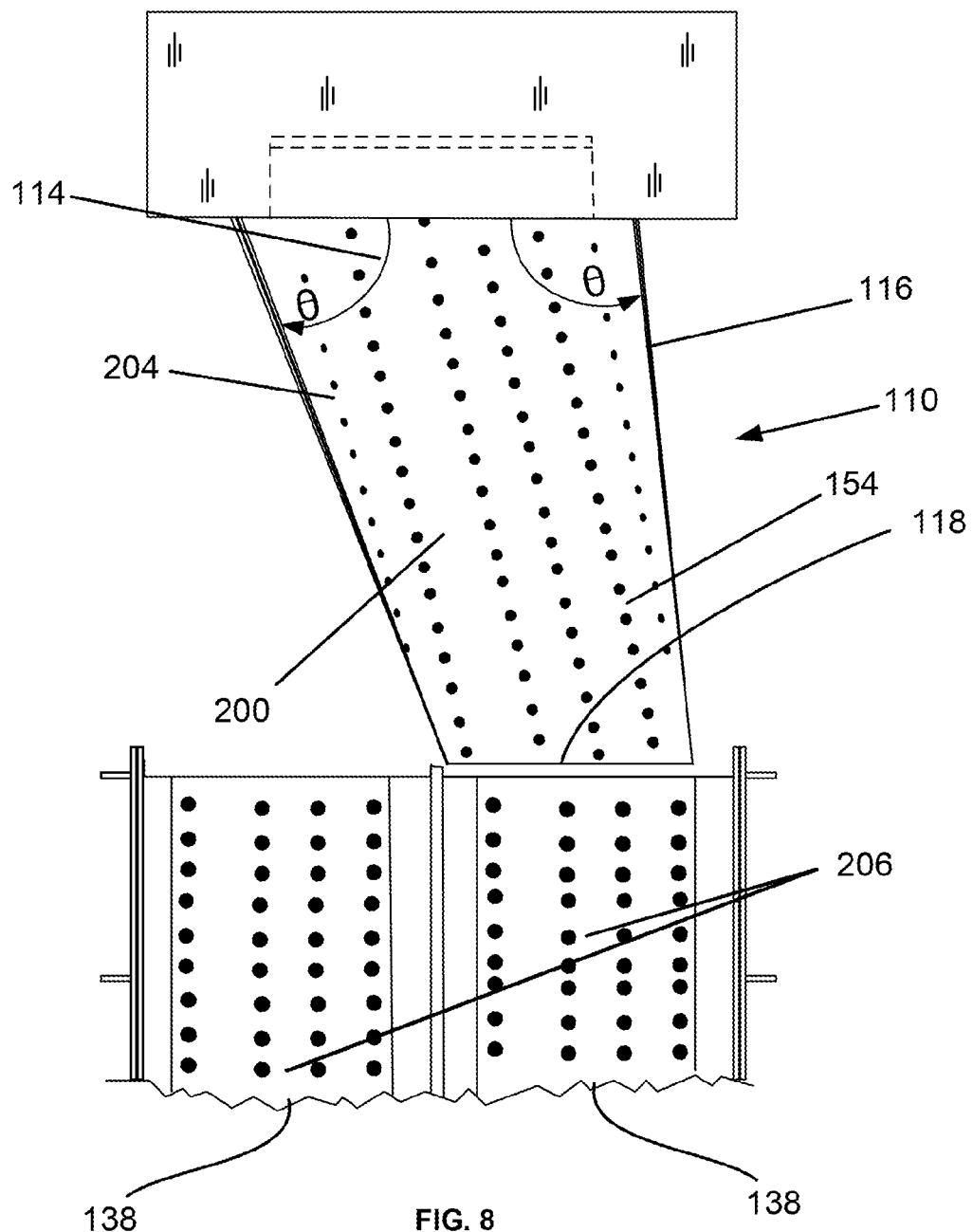
FIG. 8 is a top view of one embodiment of the entrance chute showing the segmented conveying surface.

As shown in FIG. 8, at least one sidewall 204 is typically at an angle theta from perpendicular to the entrance chute inlet. The angle theta may be between about 0° and about 20° from perpendicular to the entrance chute inlet, and in some embodiments to the conveying track. One embodiment of entrance chute 110 is configured to allow a predetermined range of motion between about 0° and about 20°, for example about 10°, whereby the sidewall's 204 angle theta to the entrance chute inlet and/or conveying track sufficiently guides objects from the conveying track onto the entrance chute 110. In such embodiments, the sidewall 204 positioning at an angle theta sufficiently guides packages/object from the conveying track onto the entrance chute 110 without the disadvantages of improper alignment, bunching, miscues of packages/items or the like.

FIGS. 9 and 10 show a cross-section of the entrance chute 110 and downstream chute 138, respectively. FIG. 9 shows that plenum 152 may be in fluid communication with a conveying surface, for example with the bottom surface 200 and at least one sidewall 204. Similarly, FIG. 10 shows that plenum 152 may be in fluid communication with downstream chute's bottom surface 206 and at least one sidewall 210. Typically, the plenum 152 includes a plurality of spaced apart apertures 162 and an optionally larger opening 164 for communicating with an air supply 177. The air supply 177 can include ambient air drawn into or out of the plenum 152 through the opening 164 by a fan 170, but can also be provided by an air compressor, in which case the fan 170 may or may not be employed. The apertures 162 provide passages from the plenum 152 to the surfaces, so that air from the supply 177 is converted into a plurality of air streams along the entrance chute 110 and downstream chute 138. Other embodiments of the conveying surface may be an inclined surface, and may be formed at least in part of a low-friction, wear-resistant, polymeric material, such as high density polyethylene.

FIGS. 9 and 10 also shows a member 180 having a plurality of spaced apart apertures 162. Other embodiments of member 180 include a variety of styles and cross-section arrangements to compliment the respective sidewall's substantially perpendicular alignment with the respective bottom surface. Further, a removable plate 186 having the opening 164 attached thereto may form a generally rectangular box. The conveyor may also include a pair of opposing sidewalls 190 extending upwardly from the box and positioning between a conveying surface, for example the bottom surface 200 and at least one side wall 204.

Also, as illustrated in FIG. 9, the bottom surfaces and sidewalls of entrance chute 110 and downstream chute 138 may include a plurality of spaced apart apertures 155, at least some of which are positioned above the apertures 162 to provide passages between the plenum 152 to exposed conveying surfaces. The conveying surfaces may include a bottom surface, a sidewall and a combination thereof. In some embodiments, the apertures 162 can be generally sized larger than the apertures 155 to make constructing the conveyor easier, and to provide some allowance for movement of the surfaces during use of the conveyor.

Figure 11:
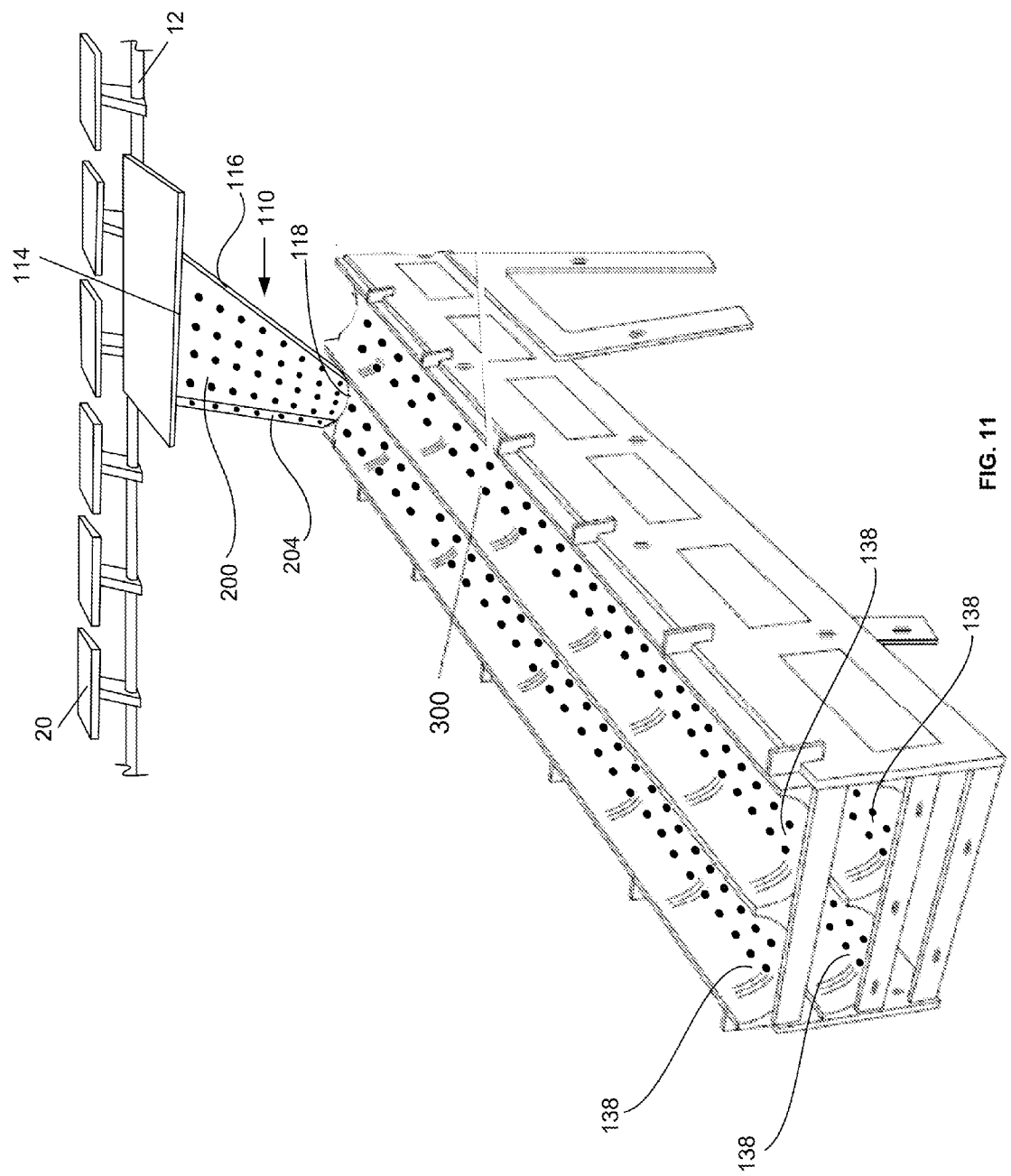
FIG. 11 is a perspective view of another embodiment of the secondary downstream chutes.

Another exemplary embodiment of the downstream chutes 138 is illustrated in FIG. 11. In this embodiment, the downstream chutes include a continuous, substantially curved chute 300. Typically, continuous chute 300 includes an air-film lubricated layer, e.g. any of the air-lubricated chute embodiments previously shown or described. In other embodiments, the continuous chute 300 may be a middle downstream chute 138 in a paired, three downstream chute embodiment.

In operation, a package moves along the conveyor track 12 to an out-feed position where it is discharged into the inlet 114 of the entrance chute 110, with the upwardly inclined downstream wall 116 slowing the forward momentum of the package and guiding the package across the entrance chute 110 into the entrance chute outlet 118. When a box package moves across the entrance chute 110, the entrance chute 110 orients the package such that an end of the package is generally perpendicular to the conveyor track 12 when the box leaves the entrance chute outlet 118. In one embodiment, gravity moves the package along the entrance chute 110 from the inlet 114 to the outlet 118 because the entrance chute inlet 114 is higher than the entrance chute outlet 118. Also, the entrance chute 110 includes a low-friction surface to reduce the coefficient of friction embodiment, the entrance chute includes a powered conveying surface for moving a package, or object, across the entrance chute 110.

The positioner assembly 120 selectively moves the entrance chute 110 so that its outlet 118 is aligned with an output position, e.g. any of the downstream chutes 138 previously shown or described. The positioner assembly 120 includes a vertical drive 124 and a hinge joint 130, pivotally connecting the entrance chute 110 to the conveyor track 12 along a lower plate 111 of the entrance chute. When the vertical drive 124 is selectively activated, the drive 124 exerts a force upon the bottom of the entrance chute 110 in an upward direction, rotating the entrance chute 110 from a lower to an upper position about the hinge joint 130 that connects the entrance chute lower plate 111 to the conveyor track 12. The entrance chute 110 moves by the force of gravity from the upper to lower position.

The entrance chute 110 also includes a rotary joint 126 for connecting the lower plate 111 of the entrance chute 110 to an upper plate 112 of the entrance chute 110. The upper plate 112 is rotated about the rotary joint 126 with a horizontal drive 125, which selectively operates in opposite directions to move the upper plate 112 of the entrance chute 110 between a right and left position. In other embodiments, the vertical drive 124 and horizontal drive means 125 of the positioner assembly drive simultaneously, as required, to selectively move the entrance chute 110 between four output positions such that the entrance chute outlet 118 deposits a package, or object, into one of the four secondary downstream chutes.

The four secondary downstream chutes 138 are aligned at the end of the conveyor. One pair of chutes rests atop and parallel to another pair below. Typically, the four secondary downstream chutes 138 have a low-friction surface. In one embodiment, gravity moves packages along the chutes, which 138 decline about 15 degrees from the entrance chute outlet 110 to a position above a floor where an operator removes the packages from the chutes 138.

Typically, the air-film lubricated entrance chute is capable of at least two distinct modes of operation. In one mode of operation, air is introduced into the plenum 152 through the opening 164 to create a positive air pressure in the plenum 152, and produce a plurality of air streams flowing from the plenum 152 to the entrance chute's bottom surface 200 and at least one sidewall 204. Similarly, through the same mode of operation, air may be introduced into the downstream chute's bottom surface 206 and at least one sidewall 210. In other embodiments, an independent plenum, e.g. any of the plenums previously shown or described, may be included in the system to introduce air-lubrication in the downstream chute 138.

Other modes of operation do not include air being circulated through the opening 164 and thus, the conveyor operates as gravity feed conveyor without regulation of the top 157 of a conveying surface and/or bottom surface 206. In yet another mode of operation, air is drawn from the plenum 152 through the opening 164 to produce a vacuum in the plenum 152. This in turn produces a plurality of air streams flowing from the top 157 of a conveying surface, e.g. any of the bottom or sidewalls previously shown or described, into the plenum 152, thereby providing a braking effect.

Changing the mode of operation of the conveyor can be provided in the form of a switch 168 for supplying electricity to the fan 170. Similarly, a vent or bypass valve may prevent or adjust airflow through the passages formed by the apertures 162 and 155, whether the fan 170 or an air compressor circulates air through the opening 164.

Certain modifications and improvements will occur to those skilled in the art upon a reading of the foregoing description. By way of example, the drive for controlling the entrance chute angle could be controlled by electric motors or the like, the chutes could be of a substantially segmented shape, the entrance chute could also use the air assisted apertures in only select portions of the chute instead of the entire chute, the entrance chute could be outfitted with the plenum assembly, and the fans could also reverse spin direction, thus creating negative pressure and create additional frictional forces in desired instances. It should be understood that all such modifications and improvements have been deleted herein for the sake of conciseness and readability but are properly within the scope of the following claims.

We claim:

1. A package sorting conveyor system comprising:
   (a) a conveying track;
   (b) at least one unloading station;
   (c) an air-film lubricated entrance chute upstream of said unloading station to receive said package, said entrance chute including (i) a plenum including a plurality of spaced apart apertures and an opening for communicating with an air supply, (ii) a segmented conveying surface in communication with said apertures, wherein said segmented conveying surface includes at least one air-film lubricated bottom surface and (iii) at least one side wall substantially perpendicular to said at least one bottom surface; and
   wherein said entrance chute further includes a positioner assembly for selectively positioning the outlet of said entrance chute.

2. The system according to claim 1, wherein said positioner assembly selectively positions the outlet of said entrance chute between at least a first and a second position.

3. The apparatus according to claim 1, wherein said positioner assembly includes a drive.

4. The apparatus according to claim 3, wherein said drive includes a rotary actuator.

5. The apparatus according to claim 3, wherein said drive includes a linear actuator.

6. The system according o claim 1, further including an entrance chute inlet adjacent to said conveying track at an unloading station for receiving a package.

7. The apparatus according to claim 6, wherein said entrance chute inlet is wider than the outlet of said entrance chute for receiving the package after it slides off said conveying track onto said inlet.

8. The system according to claim 6, wherein said at least one sidewall is located downstream of the direction of travel of said conveying track for preventing said package from tipping over by forming a transition zone funnel.

9. The system according to claim 8, wherein said entrance chute outlet is located downstream from said at least one sidewall to discharge said package from said entrance chute.

10. The apparatus according to claim 9, wherein said at least one sidewall is between about 0° and about 20° from perpendicular to said entrance chute inlet.

11. The apparatus according to claim 1, wherein said at least one sidewall is about 10° from perpendicular to said conveying track when said entrance chute is positioned perpendicular to said conveying track.

12. The apparatus according to claim 9, wherein a forward direction of said package changes about 90° from its initial direction on said conveying track to its direction at the outlet of said entrance chute.

13. The apparatus according to claim 1, further including a conveying channel including at least one downstream chute located downstream from said entrance chute.

14. The apparatus according to claim 13, wherein the conveying channel includes a plenum having a plurality of spaced apart apertures and an opening for communicating with an air supply.

15. The apparatus according to claim 14, wherein the downstream chute is segmented and is in communication with said apertures, and includes at least one air-film lubricated downstream chute bottom surface and at least one downstream chute sidewall substantially perpendicular to said at leapt one bottom surface.

16. A package sorting conveyor system comprising:
   (a) a conveying track;
   (b) at least one unloading station;
   (c) an air-film lubricated entrance chute upstream of said unloading station to receive said package, said entrance chute including (i) a plenum including a plurality of spaced apart apertures and an opening for communicating with an air supply and (ii) a segmented conveying surface in communication with said apertures, wherein said segmented conveying surface includes at least one air-film lubricated bottom surface and at least one air-film lubricated side wall substantially perpendicular to said at least one bottom surface; and (d) a positioner assembly for selectively positioning the outlet of said entrance chute.

17. The system according to claim 16, wherein said positioner assembly selectively positions the outlet of said entrance chute between at least a first and a second position.

18. The apparatus according to claim 16, wherein said positioner assembly includes a drive.

19. The apparatus according to claim 18, wherein said drive includes a rotary actuator.

20. The apparatus according to claim 18, wherein said drive includes a linear actuator.

21. The system according to claim 16, further including an entrance chute inlet adjacent to said conveying track at an unloading station for receiving a package.

22. The apparatus according to claim 16, wherein said entrance chute inlet is wider than the outlet of said entrance chute for receiving the package after it slides off said conveying track onto said inlet.

23. The system according to claim 16, wherein said at least one sidewall is located downstream of the direction of travel of said conveying track for preventing said package from tipping over by forming a transition zone funnel.

24. The system according to claim 23, wherein said entrance chute outlet is located downstream from said at least one sidewall to discharge said package from said entrance chute.

25. The apparatus according to claim 21, wherein said at least one sidewall is between about 0° and about 20° from perpendicular to said entrance chute inlet.

26. The apparatus according to claim 16, wherein said at least one sidewall is about 10° from perpendicular to said conveying track when said entrance chute is positioned perpendicular to said conveying track.

27. The apparatus according to claim 26, wherein a forward direction of said package changes about 90° from its initial direction on said conveying track to its direction at the outlet of said entrance chute.

28. The apparatus according to claim 16, further including a conveying channel including at least one downstream chute located downstream from said entrance chute.

29. The apparatus according to claim 28, wherein the at least one downstream chute is spaced horizontally.

30. The apparatus according to claim 28, wherein the at least one downstream chute is spaced vertically.

31. The apparatus according to claim 28, wherein the conveying channel includes a plenum having a plurality of spaced apart apertures and an opening for communicating with an air supply.

32. The apparatus according to claim 28, wherein the downstream chute is segmented and is in communication with said apertures, and includes at least one air-film lubricated downstream chute bottom surface and at least one downstream chute sidewall substantially perpendicular to said at least one bottom surface.

33. The apparatus according to claim 16, further including providing at least two distinct modes of operation.

34. The apparatus according to claim 33, wherein the modes of operation includes actively moving air through said plenum to provide an air-film, stopping the air flow or reversing the air flow to provide a braking effect.

35. The apparatus according to claim 34, further including changing the modes of operation.

36. The apparatus according to claim 16, further including an air supply.

37. The apparatus according to claim 36, wherein said air supply is ambient air under pressure.

38. The apparatus according to claim 37, wherein said air supply includes a fan for circulating air through said opening into said plenum and out of said apertures to provide the air-film.

39. The apparatus according to claim 16, wherein the conveying surface is inclined.

40. The apparatus according to claim 16, further including a pair of air-film lubricated sidewalls substantially perpendicular to said at least one bottom surface.

41. The apparatus according to claim 16, wherein said conveying surface includes a low-friction, wear-resistant polymeric material.

42. The apparatus according to claim 41, wherein said material is a high-density polyethylene.

43. The apparatus according to claim 28, wherein the surfaces of said at least one secondary downstream chute located downstream from conveying surface include at least one removable sheet of a low-friction, wear-resistant polymeric material.

44. The apparatus according to claim 43, wherein said material is selected for summer use where humidity levels are greater than about 50% relative humidity and winter use where humidity levels are less than about 50% relative humidity for low-density polyethylene (LDPE) and similar packaging.

* * * * *

UNITED STATES PATENT AND TRADEMARK OFFICE
CERTIFICATE OF CORRECTION

PATENT NO. : 8,376,663 B2  Page 1 of 1
APPLICATION NO. : 12/721041
DATED : February 19, 2013
INVENTOR(S) : Erceg et al.

It is certified that error appears in the above-identified patent and that said Letters Patent is hereby corrected as shown below:

In the Specifications

In Column 6, Line 49, last of the sentence is omitted. The line should read:

...the coefficient of friction "between the package, or object, and the entrance chute surface. In an alternative"...

In the Claims

In Column 8, Line 21, after according, the o should be the word "to"

In Column 8, Line 58, the word leapt should be "least"

Signed and Sealed this
Twenty-third Day of April, 2013

Teresa Stanek Rea
*Acting Director of the United States Patent and Trademark Office*